（12）United States Patent
Matz et al.

(10) Patent No.: US 9,903,495 B2
(45) Date of Patent: Feb. 27, 2018

(54) SOFT-SERVE CONFECTION VALVE

(75) Inventors: Nathan A. Matz, Beloit, WI (US);
Robert K. Newton, Beloit, WI (US)

(73) Assignee: Carrier Commerical Refrigeration, Inc., Farmington, CT (US)

( * ) Notice: Subject to any disclaimer, the term of this patent is extended or adjusted under 35 U.S.C. 154(b) by 815 days.

(21) Appl. No.: 13/636,140

(22) PCT Filed: Mar. 18, 2011

(86) PCT No.: PCT/US2011/028927
§ 371 (c)(1),
(2), (4) Date: Sep. 20, 2012

(87) PCT Pub. No.: WO2011/152918
PCT Pub. Date: Dec. 8, 2011

(65) Prior Publication Data
US 2013/0068331 A1    Mar. 21, 2013

Related U.S. Application Data

(60) Provisional application No. 61/351,453, filed on Jun. 4, 2010.

(51) Int. Cl.
*B67D 3/00* (2006.01)
*F16K 27/00* (2006.01)
*F16K 11/07* (2006.01)

(52) U.S. Cl.
CPC ............. *F16K 27/00* (2013.01); *F16K 11/07* (2013.01); *Y10T 137/86879* (2015.04)

(58) Field of Classification Search
CPC .... B05C 5/0208–5/022; B05C 5/0225–5/0229
USPC ... 222/505, 507, 509, 511–518, 559, 153.13, 222/153.14, 330, 331, 146.6, 145.6; 137/625.48, 872; 251/90, 92, 93, 101, 251/106, 107, 111, 112, 113, 114; 62/390, 389, 340, 233; 99/450.6–450.8, 99/494; 141/329; 116/277, 281–283; 426/279–284; 604/33
See application file for complete search history.

(56) References Cited

U.S. PATENT DOCUMENTS 102,290 A * 4/1870 Maxwell .......................... 70/176
251,406 A * 12/1881 Brooks .............................. 137/1
(Continued)

FOREIGN PATENT DOCUMENTS

EP    2067407 A2    6/2009
GB    2204383 A    11/1988
(Continued)

OTHER PUBLICATIONS

International Search Report and Written Opinion for PCT/US2011/028927, dated Jul. 6, 2011.

*Primary Examiner* — Paul R Durand
*Assistant Examiner* — Randall Gruby
(74) *Attorney, Agent, or Firm* — Bachman & LaPointe, P.C.

(57) ABSTRACT

A valve assembly for dispensing a confectionary product has an inlet (70), a first outlet (72), and a second outlet (90). The assembly has a valve member (80) shiftable between: a first condition providing communication between the inlet and the first outlet; and a second condition providing communication between the inlet and the second outlet.

21 Claims, 14 Drawing Sheets

(56) References Cited

U.S. PATENT DOCUMENTS

| | | | | |
|---|---|---|---|---|
| 904,329 A * | 11/1908 | Hohman | | 251/112 |
| 1,352,270 A * | 9/1920 | Jefferson | | 116/283 |
| 1,384,954 A * | 7/1921 | Hoke | | 239/416.4 |
| 1,634,416 A * | 7/1927 | Galland | | 141/276 |
| 1,839,609 A * | 1/1932 | Spaeth | | 222/1 |
| 1,921,092 A * | 8/1933 | Newton | | 137/625.27 |
| 1,930,944 A * | 10/1933 | Schmitz, Jr. | | 222/48 |
| 2,094,926 A * | 10/1937 | Nutter et al. | | 137/625.69 |
| 2,130,614 A * | 9/1938 | Collins et al. | | 137/244 |
| 2,156,518 A * | 5/1939 | Titus | | 222/509 |
| 2,343,774 A * | 3/1944 | Klein | | 285/8 |
| 2,445,130 A * | 7/1948 | Turner | | 141/290 |
| 2,606,706 A * | 8/1952 | Nielsen | | 141/236 |
| 2,619,116 A * | 11/1952 | Ralston | | 137/561 R |
| 2,639,729 A * | 5/1953 | Tulumello et al. | | 137/635 |
| 2,646,190 A * | 7/1953 | Hensgen et al. | | 222/109 |
| 2,716,998 A * | 9/1955 | Knasko | | 137/231 |
| 2,778,375 A * | 1/1957 | Hans-Martin et al. | | 137/244 |
| 2,977,980 A * | 4/1961 | Scholin | | 137/538 |
| 3,172,422 A * | 3/1965 | Koch | | 137/375 |
| 3,276,633 A * | 10/1966 | Rahauser | | 222/129.1 |
| 3,285,278 A * | 11/1966 | Corlett | | 137/454.2 |
| 3,420,268 A * | 1/1969 | Mueller | | 137/897 |
| 3,505,972 A * | 4/1970 | Benjamin | | 116/277 |
| 3,589,564 A * | 6/1971 | Keller | | 222/153.14 |
| 3,698,206 A * | 10/1972 | Werner | | 62/342 |
| 3,762,431 A * | 10/1973 | Wilson et al. | | 137/116.3 |
| 3,771,322 A * | 11/1973 | Betschart | | 62/345 |
| 3,804,056 A * | 4/1974 | Lee et al. | | 116/277 |
| 3,817,165 A * | 6/1974 | Bartley | | 99/450.8 |
| 3,934,759 A * | 1/1976 | Giannella et al. | | 222/129.1 |
| 3,951,170 A * | 4/1976 | Hill | | 137/625.48 |
| 3,989,492 A * | 11/1976 | Keyes | | 62/136 |
| 3,999,691 A * | 12/1976 | Doom | | 222/330 |
| 4,109,673 A * | 8/1978 | Horowitz et al. | | 137/381 |
| 4,203,461 A | 5/1980 | Schwitters | | |
| 4,478,355 A * | 10/1984 | Houman | | 222/54 |
| 4,502,508 A * | 3/1985 | Lester | | 137/625.69 |
| 4,580,905 A | 4/1986 | Schwitters et al. | | |
| 4,711,376 A * | 12/1987 | Manfroni | | 222/146.1 |
| 4,747,427 A * | 5/1988 | Smith et al. | | 137/270 |
| 4,844,115 A * | 7/1989 | Bowers | | 137/240 |
| 4,878,760 A | 11/1989 | Newton et al. | | |
| 4,928,592 A * | 5/1990 | Moshier et al. | | 99/450.8 |
| 5,025,840 A | 6/1991 | Tacke | | |
| 5,096,503 A * | 3/1992 | Wellman | | 134/22.18 |
| 5,150,820 A * | 9/1992 | McGill | | 222/95 |
| 5,247,966 A * | 9/1993 | Stevens et al. | | 137/625.69 |
| 5,405,054 A * | 4/1995 | Thomas | | 222/95 |
| 5,463,877 A * | 11/1995 | Young et al. | | 62/264 |
| 5,524,683 A | 6/1996 | Mueller | | |
| 5,743,640 A * | 4/1998 | Crossley | | 366/194 |
| 5,957,040 A | 9/1999 | Feola | | |
| 6,119,905 A * | 9/2000 | Cocchi et al. | | 222/509 |
| 6,257,286 B1 | 7/2001 | Gaetano | | |
| 6,299,025 B1 * | 10/2001 | Watanabe et al. | | 222/146.6 |
| 6,325,250 B1 | 12/2001 | Feola | | |
| 6,378,573 B2 * | 4/2002 | Schwartz | | 141/114 |
| 6,435,377 B1 * | 8/2002 | Iwata et al. | | 222/397 |
| 6,485,768 B2 | 11/2002 | Feola | | |
| 6,490,872 B1 * | 12/2002 | Beck et al. | | 62/66 |
| 6,553,779 B1 | 4/2003 | Boyer et al. | | |
| 6,723,361 B2 | 4/2004 | Feola | | |
| 6,832,636 B2 * | 12/2004 | Harrison | | 141/392 |
| 7,147,134 B2 * | 12/2006 | Gutierrez et al. | | 222/146.1 |
| 7,314,183 B2 * | 1/2008 | Zuccaro | | 239/33 |
| 7,618,251 B2 * | 11/2009 | Steiner | | A23G 1/0066 222/439 |
| 7,665,398 B2 | 2/2010 | Gerber | | |
| 8,297,182 B2 * | 10/2012 | Cocchi et al. | | 99/455 |
| 2004/0089830 A1 * | 5/2004 | Beyrak | | 251/90 |
| 2005/0173462 A1 | 8/2005 | Stumler et al. | | |
| 2006/0043324 A1 * | 3/2006 | Kingsford et al. | | 251/101 |
| 2007/0062981 A1 * | 3/2007 | Cocchi | | A23G 9/281 222/509 |
| 2007/0256444 A1 * | 11/2007 | Kim et al. | | 62/390 |
| 2014/0190991 A1 * | 7/2014 | Yang et al. | | 222/95 |
| 2017/0099855 A1 * | 4/2017 | Cocchi | | A23G 9/16 |

FOREIGN PATENT DOCUMENTS

GB 2270141 A 3/1994
WO 2009/005206 A1 1/2009

* cited by examiner

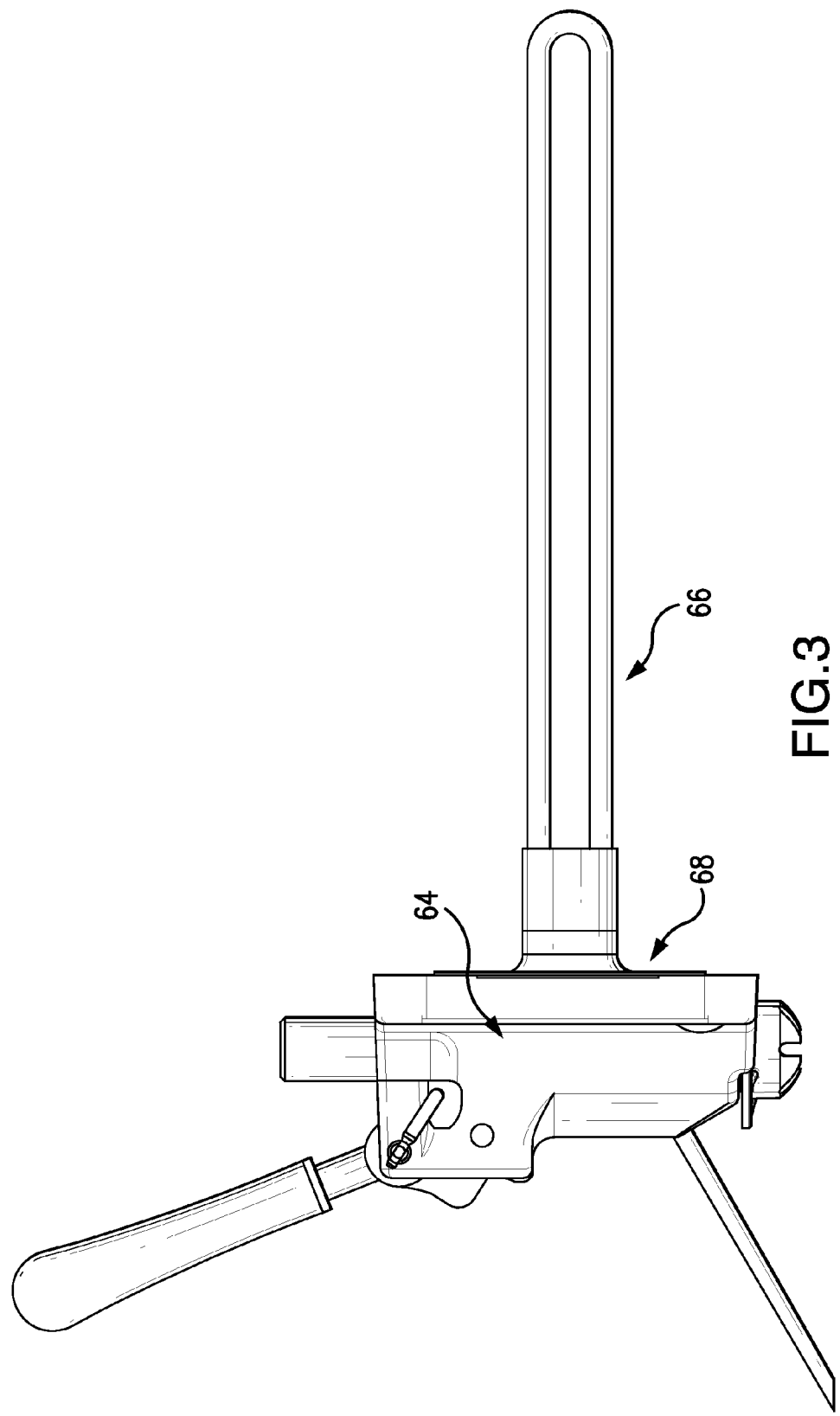

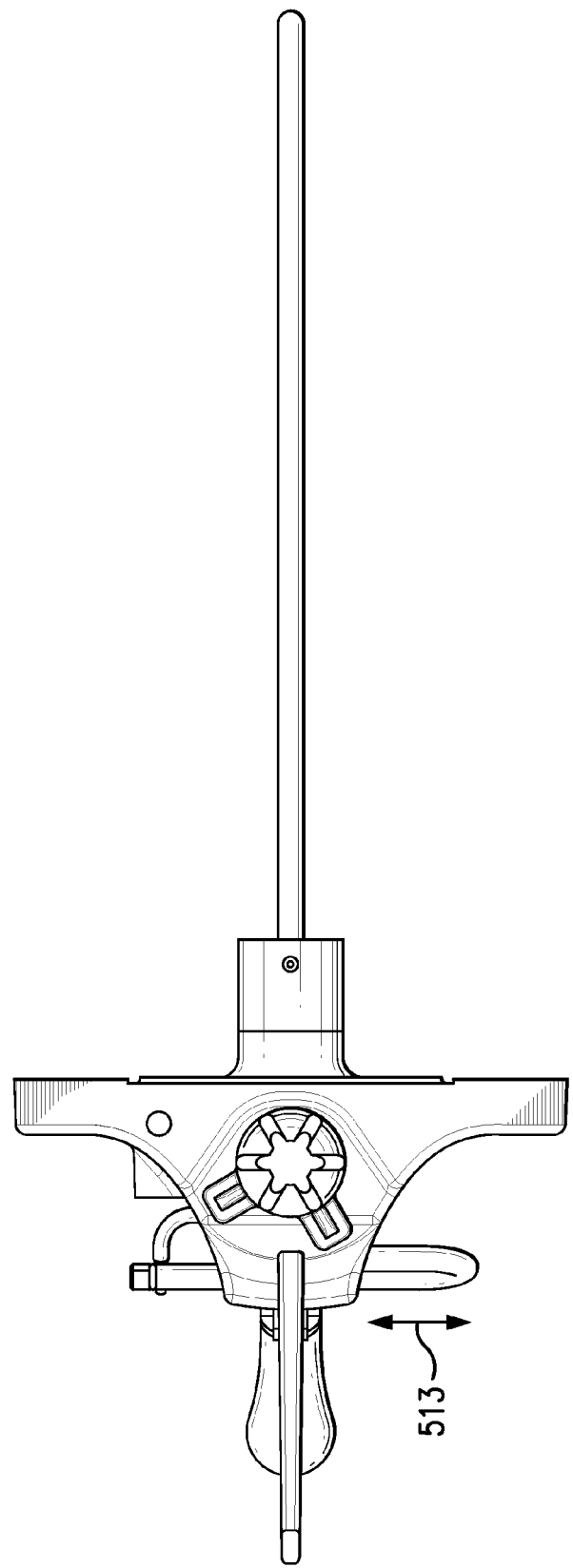

SOFT-SERVE CONFECTION VALVE

CROSS-REFERENCE TO RELATED APPLICATION

Benefit is claimed of U.S. Patent Application Ser. No. 61/351,453, filed Jun. 4, 2010, and entitled "Soft-Serve Confection Valve", the disclosure of which is incorporated by reference herein in its entirety as if set forth at length.

BACKGROUND

The disclosure relates to dispensing of frozen confectionary products such as soft-serve ice cream, ice milk, frozen yogurt, artificial substitutes therefor, and the like. More particularly, the disclosure relates to dispensing valves for dispensers of such product.

Frozen confection dispensing systems are commonly used in the food service industry. An exemplary system configuration comprises a cabinet containing a mixing vessel (e.g., hopper) for mixing the confection. From the mixing vessel, the confection passes to a freezing vessel (e.g., a freezing cylinder). An air pump may add air to the mix. A refrigeration system may refrigerate the confection in the mixing hopper and freeze the confection in the freezing cylinder (cooled to a frozen or semi-frozen state).

The cabinet may contain one or more stages of pumps for driving the confection from the vessel to a delivery head/valve assembly. An exemplary pump is positioned between the mixing upper and freezing cylinder, with a rotary action of the freezing cylinder acting as a further pump. An exemplary valve assembly is mounted on the front of the cabinet. The valve assembly typically has a downward-facing outlet for discharging the confection into a bowl, cup, cone, or the like. The valve may be manually-actuated (e.g., via a lever pivotable upward or downward about a transverse hinge axis from an off condition to a dispensing condition).

Variations include electrically-controlled valves. Other variations include multi-flavor cabinets which may utilize separate valves/outlets for each flavor or which may have a selectorized valve system for alternative (and/or mixed) feeding of each flavor to a common outlet.

SUMMARY

One aspect of the disclosure involves a valve assembly for dispensing a confectionary product. The assembly has an inlet, a first outlet, and a second outlet. The assembly has a valve member shiftable between: a first condition providing communication between the inlet and the first outlet; and a second condition providing communication between the inlet and the second outlet.

In various implementations, in the first condition, the valve element may block communication between the inlet and the second outlet. In the second condition, the valve element may block communication between the inlet and the first outlet. The valve element may have a third condition blocking communication between the inlet and both the first outlet and second outlet. The assembly may further include an actuator coupled to a valve element and manually engagable by a user to shift the valve element between the first condition and the second condition. The actuator may comprise a lever. The lever may be shiftable from a neutral condition (e.g., associated with said valve element third condition) to respective first and second lever conditions to respectively shift the valve element to the valve element's first and second conditions.

Other aspects of the disclosure involve a product dispensing system comprising a cabinet having a front. A source of the confectionary product is within the cabinet. The valve assembly is mounted on the front and has its inlet coupled to the source. The system may be combined with the confectionary product. The confectionary product may be a frozen confectionary product. The source may comprise a refrigeration system.

The dispensing system may be manufactured by removing a single-outlet valve assembly and replacing the single-outlet valve assembly with the present valve assembly.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a left side view of a valve assembly of the freezer of FIG. 1 in a neutral position with a selector in a cone/pour position.
FIG. 4 is a bottom view of the valve assembly of FIG. 3.

Like reference numbers and designations in the various drawings indicate like elements.

DETAILED DESCRIPTION

Figure 2:
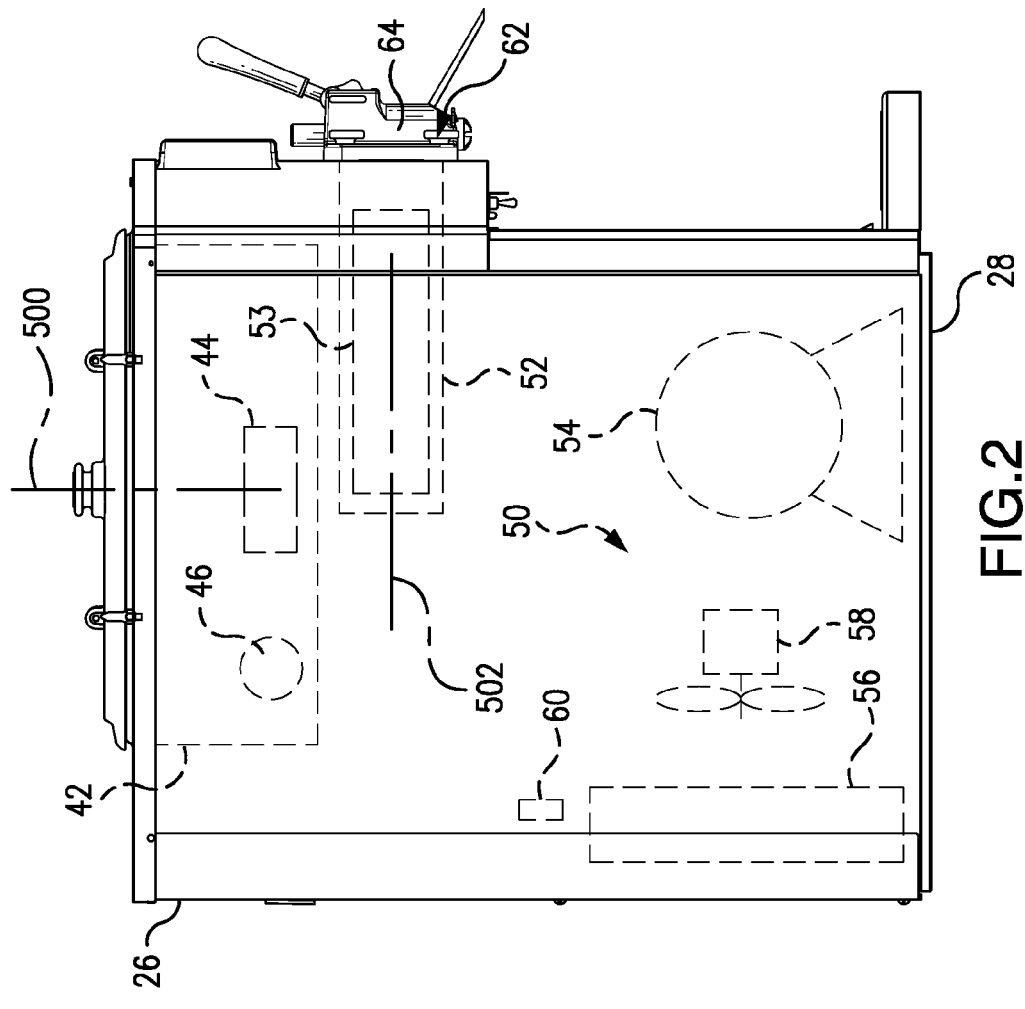
FIG. 2 is a right side view of the freezer of FIG. 1.
Figure 1:
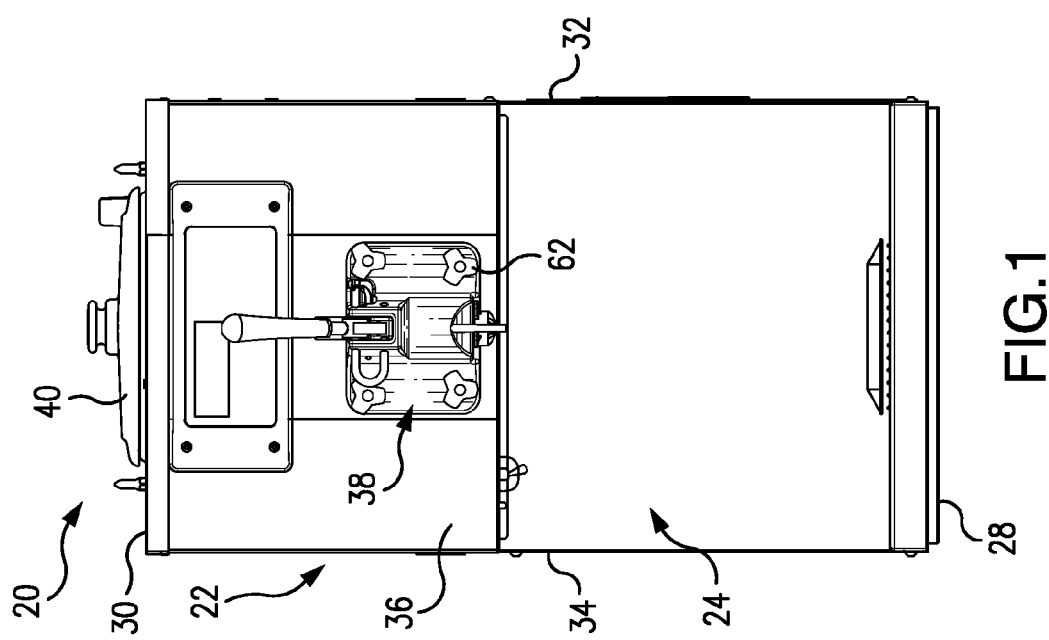
FIG. 1 is a front view of a soft-serve freezer.

FIGS. 1&2 show a soft-serve freezer 20 which is formed as a modification of an existing model C708 Soft-Serve Freezer of Taylor Company (a division of Carrier Commercial Refrigeration, Inc.) of Rockton, Ill. However, other freezers may be similarly modified (including other general configurations and multi-flavor or other variations on the illustrated or other configuration). The freezer comprises a cabinet 22 having a front 24, a back 26, a base or bottom 28, a top 30, and respective left and right sides 32 and 34. An upper portion of the cabinet front is formed by a panel 36 to which a dispensing valve assembly 38 is mounted. The exemplary top includes a removable cover/lid 40. The lid 40 covers a mixing hopper 42 for receiving and mixing the confection or its ingredients (e.g., having an agitator 44 (driven for rotation about an axis 500) and having an air injection pump 46).

A refrigeration system 50 (e.g., a compression-expansion cycle) is provided to refrigerate the confection in the hopper. A freezing cylinder 52 is located between the hopper 42 and the valve assembly 38. The freezing cylinder contains a beater assembly 53 (driven for rotation about an axis 502). The refrigeration system includes appropriate heat exchangers to cool the hopper 42 and freezing cylinder 52 to appropriate temperatures and maintain them. The heat absorption heat exchangers (which absorb heat in the normal mode (as distinguished from defrost mode, cleaning mode, or pasteurization mode)) may be integrated with the hopper 42 and cylinder 52. A compressor of the refrigeration system is schematically shown as 54, a normal mode heat rejection heat exchanger as 56, its associated fan as 58, and an expansion device as 60.

Figure 8:
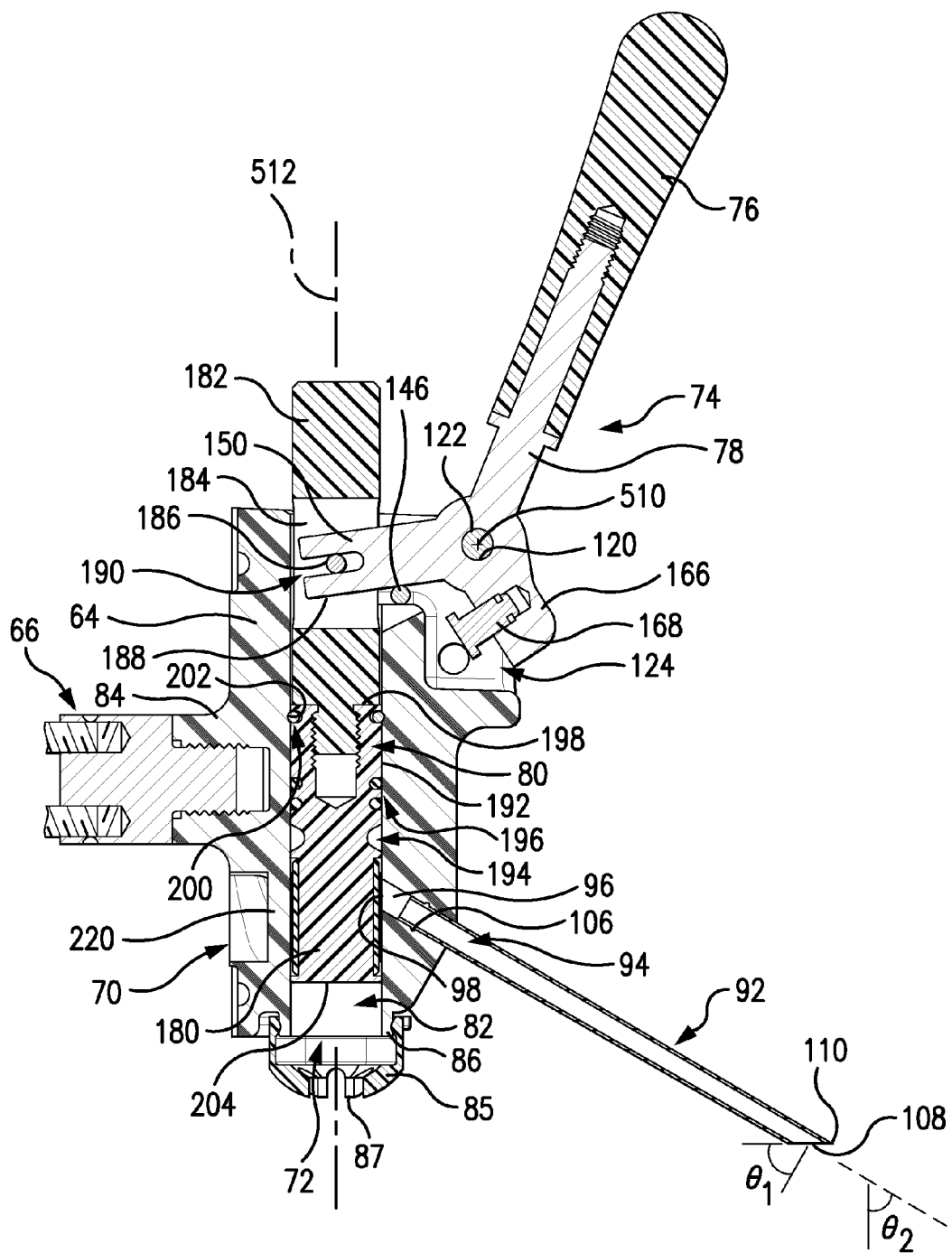
FIG. 8 is a vertical longitudinal sectional view of the valve assembly, taken along line 8-8 of FIG. 6.

The exemplary valve assembly 38 serves as a door which closes the downstream end of the freezing cylinder. The exemplary valve assembly 38 is mounted via hand-actuated screws 62 to permit removal and reinstallation for system cleaning. FIGS. 3-8 show details of the valve assembly 38. The valve assembly includes a door/valve body 64 (FIG. 3) which may be machined of an alloy (e.g., food-grade stainless steel) or molded of a food-grade plastic (e.g., VALOX 315 polybutylene terephthalate (PBT) of GE Plastics). A baffle assembly 66 extends from an aft face/surface 68 of the body 64. The door/valve body 64 includes an inlet 70 (FIG. 8) for receiving the confection from the freezing cylinder and an outlet 72 for dispensing the confection into bowls, cups, cones, and the like. The exemplary valve assembly 38 is a manually-actuated valve which the user may actuate via rotating a lever 74 (e.g., via a handle 76 at a distal end of a lever arm (driving arm) 78) about a lever axis 510. The lever, in turn, controls movement of a piston-like valve member (element) 80 within a vertical bore (valve compartment) 82 of the valve body 64. FIG. 8 further shows the baffle 66 mounted to a central boss 84 along the rear of the valve body 64. The baffle 66 is concentrically received within the beater/scrapper assembly (53 of FIG. 2). A nozzle/cap 85 (FIG. 8) may be secured to the body at the outlet 72. For example, there may be snap-fit engagement with an outwardly open channel and an outlet boss 86. The cap may have an interior surface of a cross-section selected to provide a desired extrusion profile (e.g., a star-shaped cross-section or a fluted cross-section). When present, the downstream rim 87 of the cap may alternatively be regarded as forming an outlet.

Figure 9:
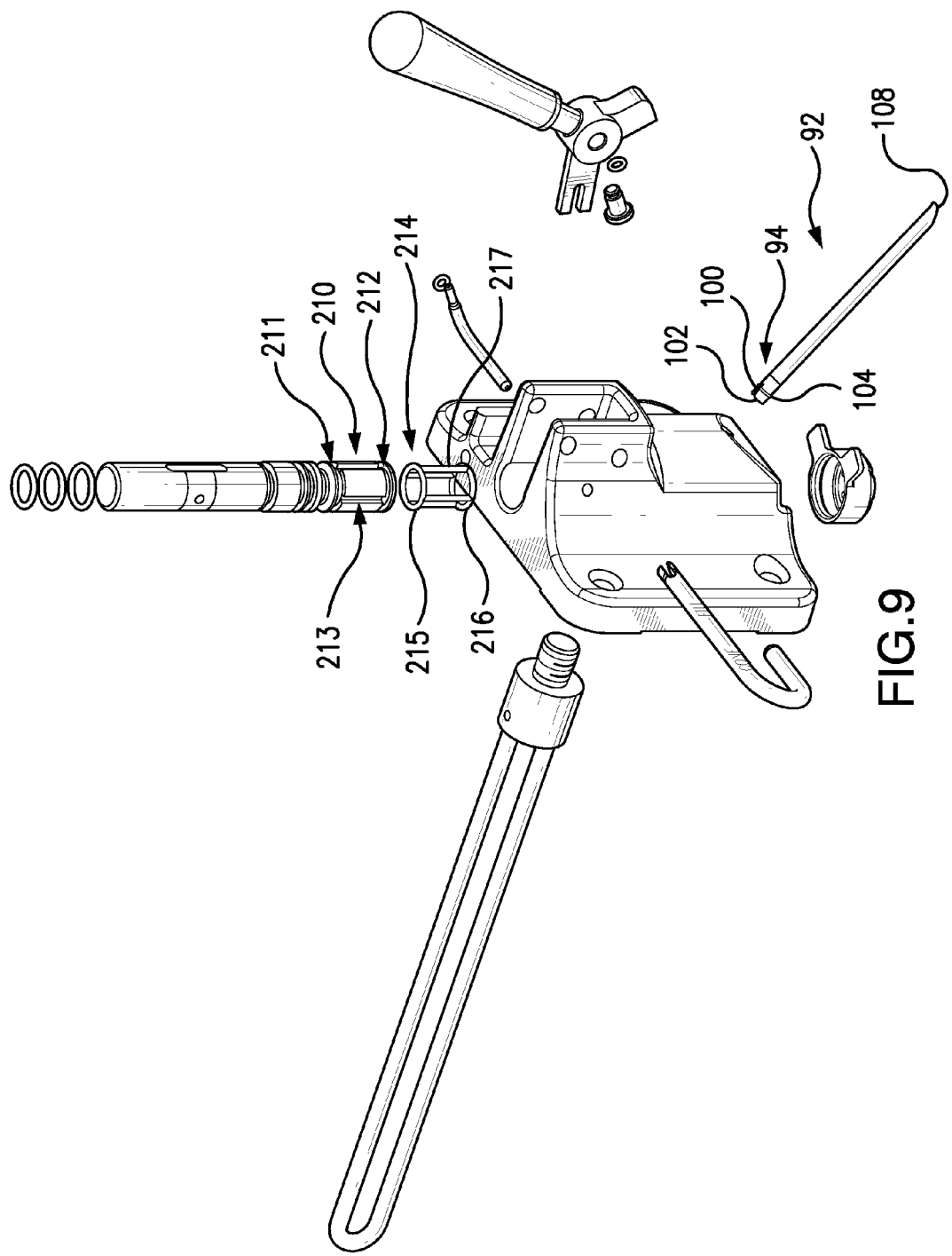
FIG. 9 is an exploded view of the valve assembly.

As so far described in this section, the system may represent any of a number of existing baseline systems (although the present principles may be applied to other systems as well). In the system 20, however, the outlet 72 is a first outlet and the system further includes a second outlet 90 (FIG. 8). The second outlet 90 may be used to inject the confection into pastry, baked goods, and the like (collectively a "food product") rather than merely pour or vertically extrude the confection into an open container such as a cup, bowl, cone, or the like. The exemplary second outlet 90 is at the distal end of a narrow probe or sting 92 having a proximal end portion 94 is mounted to the valve body (e.g., threaded or snap-fit into a cross-bore 96 having an opening 98 along the vertical bore 82). The exemplary probe 92 (FIG. 9) has a pair of axially-extending, diametrically opposite, through-slots 100 extending to the proximal rim 102. This allows the opposite sides of the proximal portion to be compressed toward each other to insert and extract the probe. To provide a detented retention of the probe, at an axial position along the slot and relatively near its base, the exemplary probe includes a circumferential rib 104 which engages a complementary circumferential channel 106 (FIG. 8) in the cross bore. The exemplary outlet 90 formed at the distal rim 108 is oriented at an angle $\theta_1$ off radial. To facilitate piercing, exemplary $\theta_1$ is other than 0° (e.g., 30-60°). This leaves a longitudinal extreme 110 of the distal rim 108 angled for piercing into the food product. Whereas the exemplary axis 512 is essentially vertical (e.g., within 20°, more narrowly within 10°) of vertical, the exemplary probe extends well-off vertical, with a central longitudinal axis of the probe is at angle $\theta_2$ off-vertical (e.g., 30-60°). An exemplary sting is of a molded food-grade plastic (e.g, polypropylene).

Figure 5:
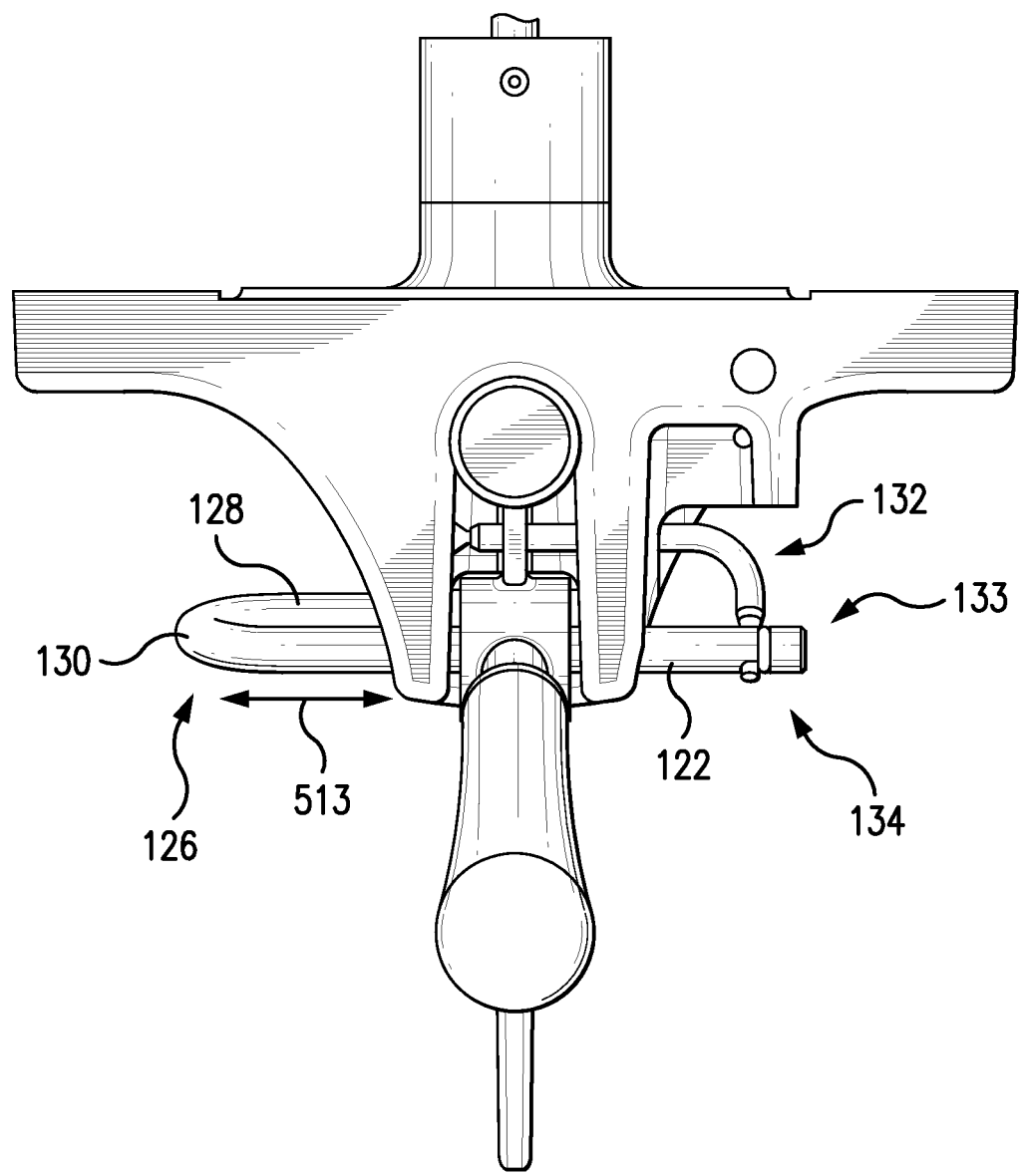
FIG. 5 is a partial top view of the valve assembly of FIG. 3.
Figure 6:
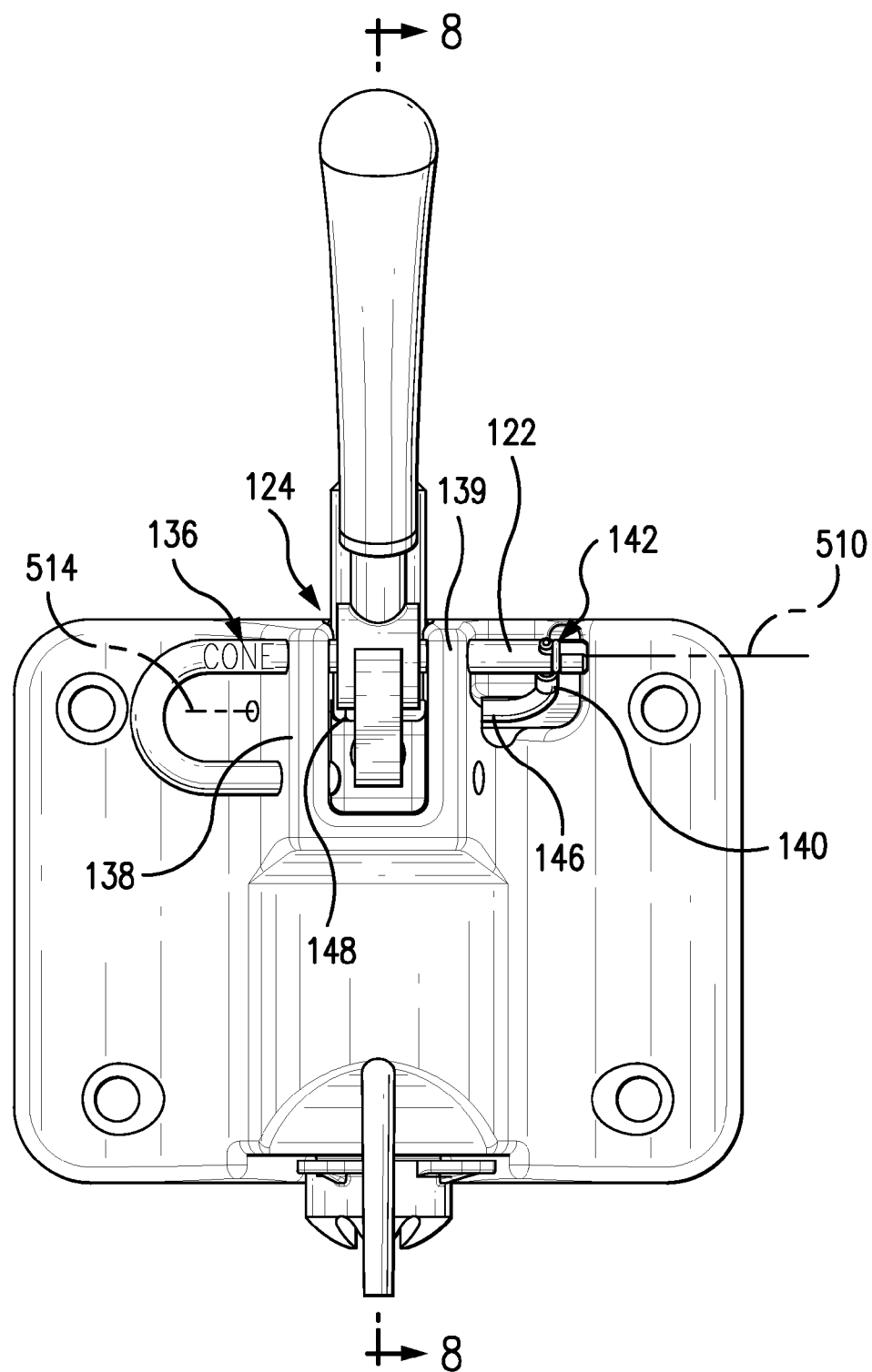
FIG. 6 is a front view of the valve assembly of FIG. 3.
Figure 7:
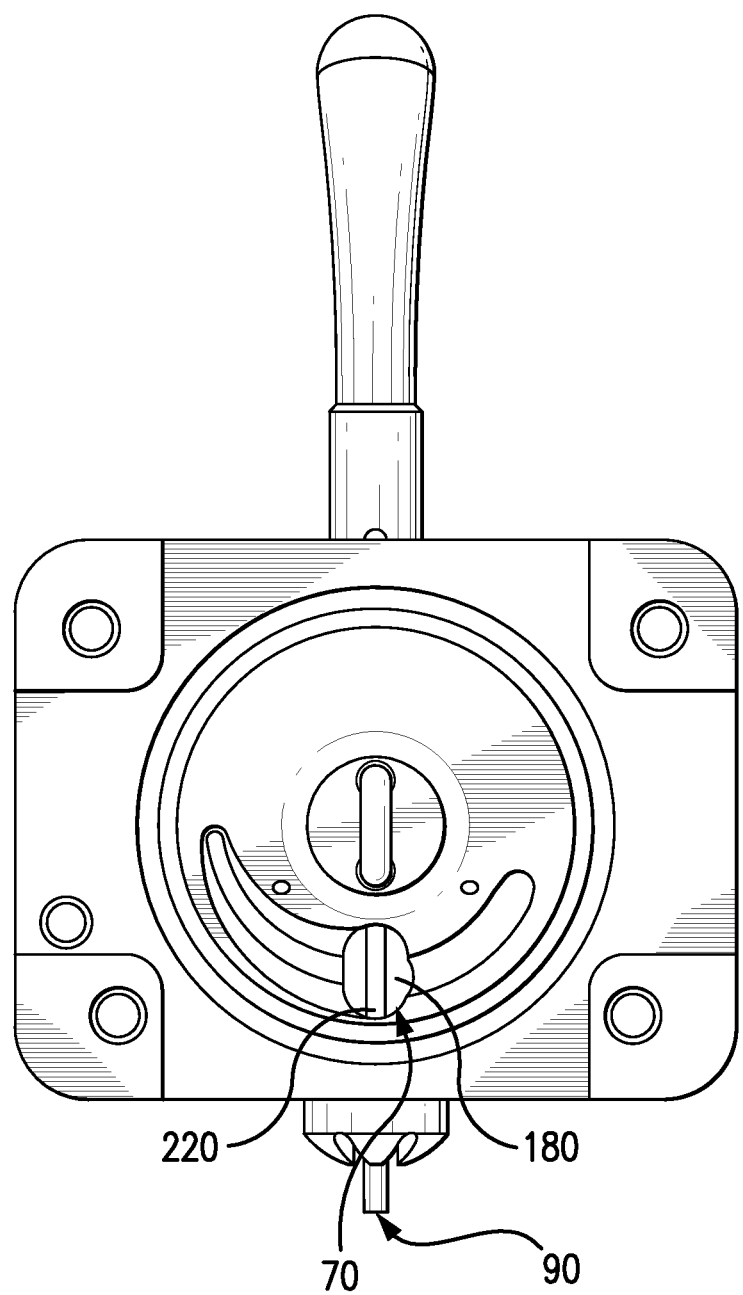
FIG. 7 is a rear view of the valve assembly of FIG. 3.

Relative to the baseline single-outlet valve assembly, the valve body, valve element, and/or actuator may be further modified to shift the valve element 80 along the valve/bore axis 512 between a first condition (a "pouring" or "drawing" condition), providing communication between the inlet 70 and the first outlet 72; a second condition (an "injecting" condition) providing communication between the inlet 70 and the second outlet 90; and a third (off or neutral) condition blocking communication between the inlet and both the first outlet and second outlet. In the first condition, the valve element blocks communication between the inlet and the second outlet; and in the second condition, the valve element blocks communication between the inlet and the first outlet. As is discussed further below, from the neutral condition (intermediate position/orientation of the lever of FIG. 8), the respective first and second conditions are provided by rotating the handle downward (clockwise as viewed in FIG. 8) and upward (counterclockwise as viewed in FIG. 8) about the axis 510. The rotation may be facilitated by mounting a pivot aperture 120 of the lever on an axle 122 extending through the sidewalls of a channel 124 of the body 64. The exemplary axle 122 is formed as the longer of the two legs of a J-shaped main selector pin 126 (FIG. 5). The pin 126 has a shorter leg 128 joined to the longer leg 122 by a loop end (180° turn) 130. As is discussed further below, the pin 126 combines with a secondary pin 132 to form a moving member or selector 133 of a selector or locking mechanism 134. The moving member is shiftable between first and second conditions (via a bi-directional shift 513). In the first condition, the moving member blocks movement of the lever to the lever second condition but permits movement of the lever to the lever first condition. In the second condition, the moving member blocks movement of the lever to the lever first condition but permits movement of the lever to the lever second condition.

Figure 10:
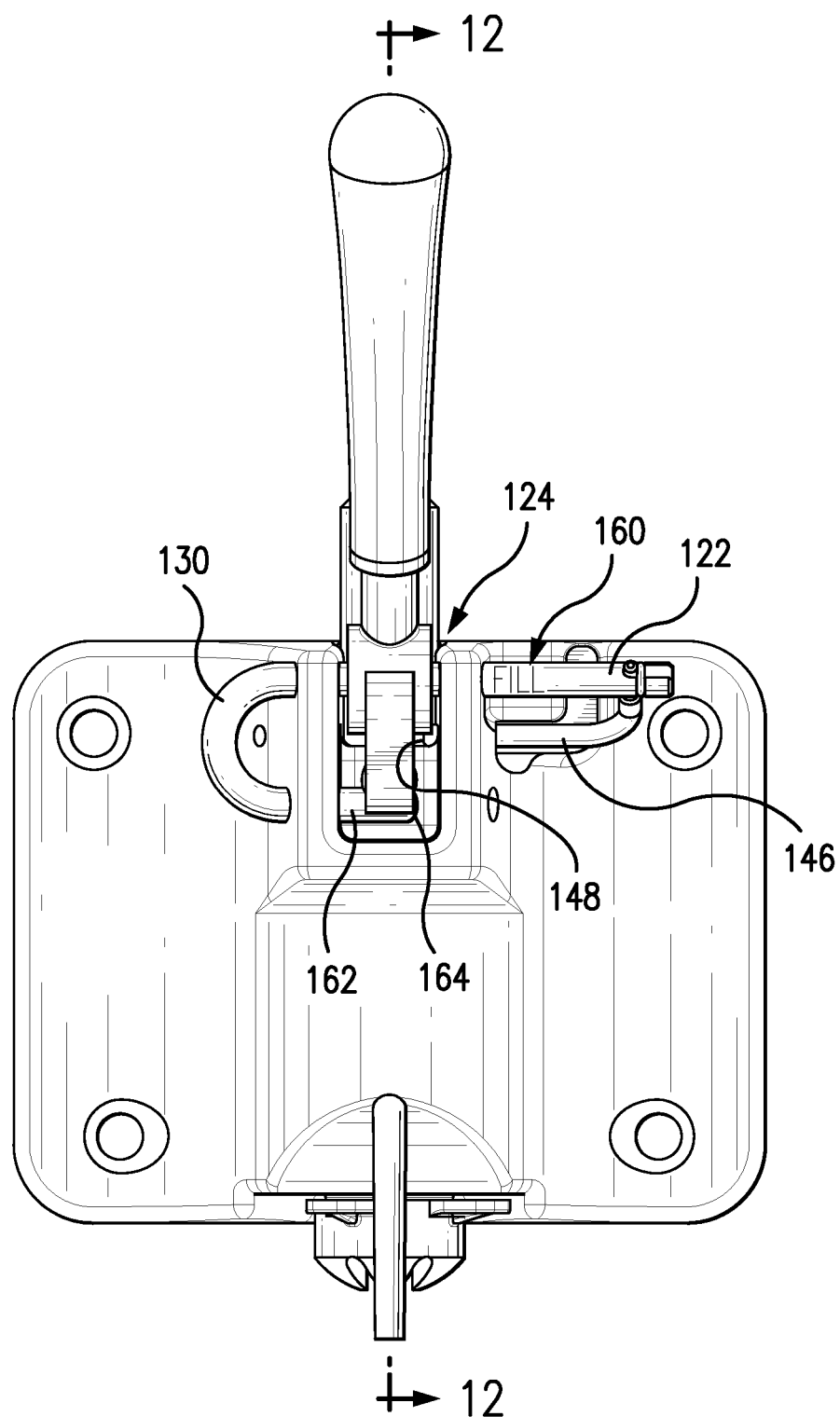
FIG. 10 is a front view of the valve assembly in a neutral position with the selector in an injection/fill position.
Figure 11:
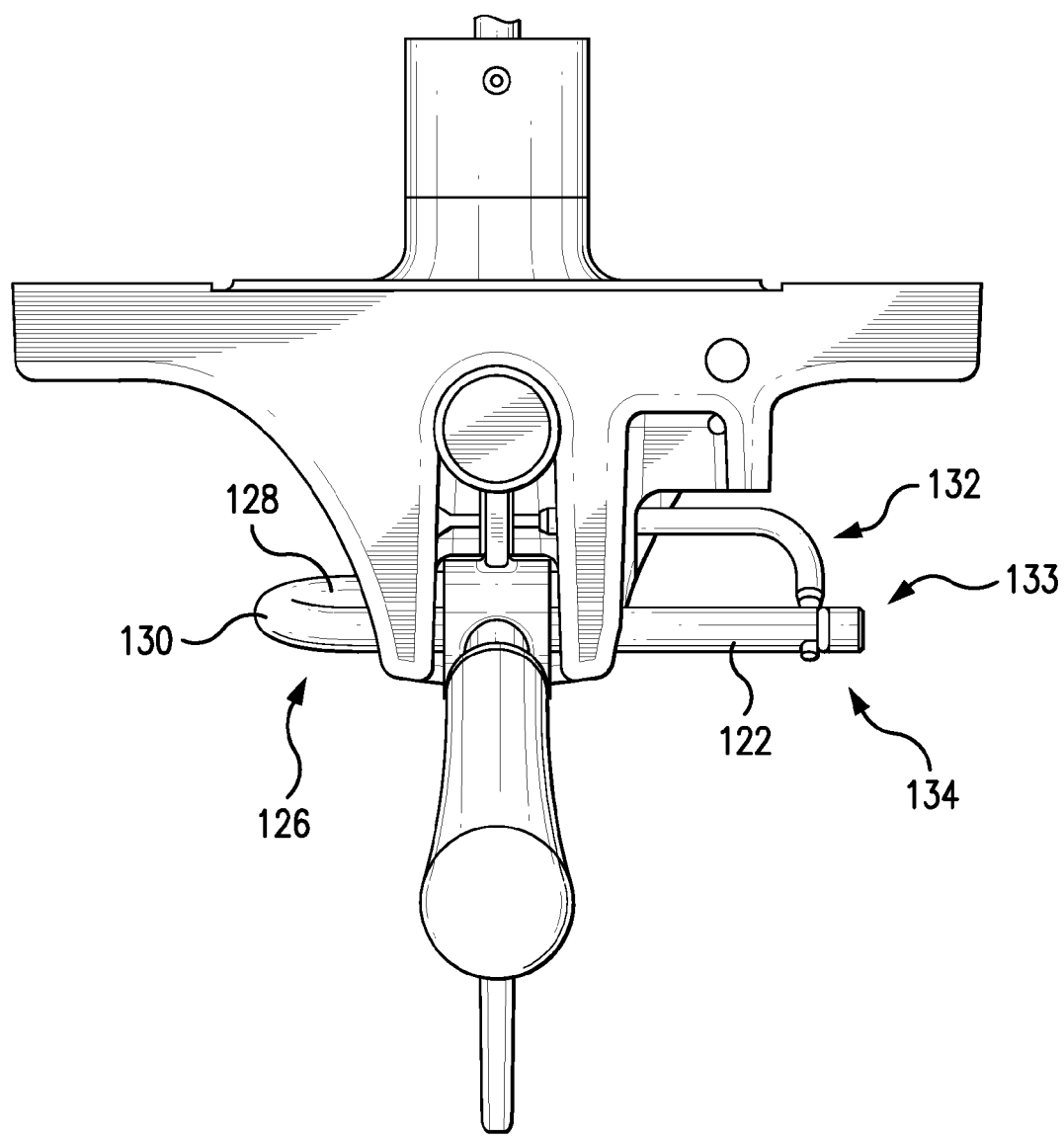
FIG. 11 is a partial top view of the valve assembly of FIG. 10.
Figure 12:
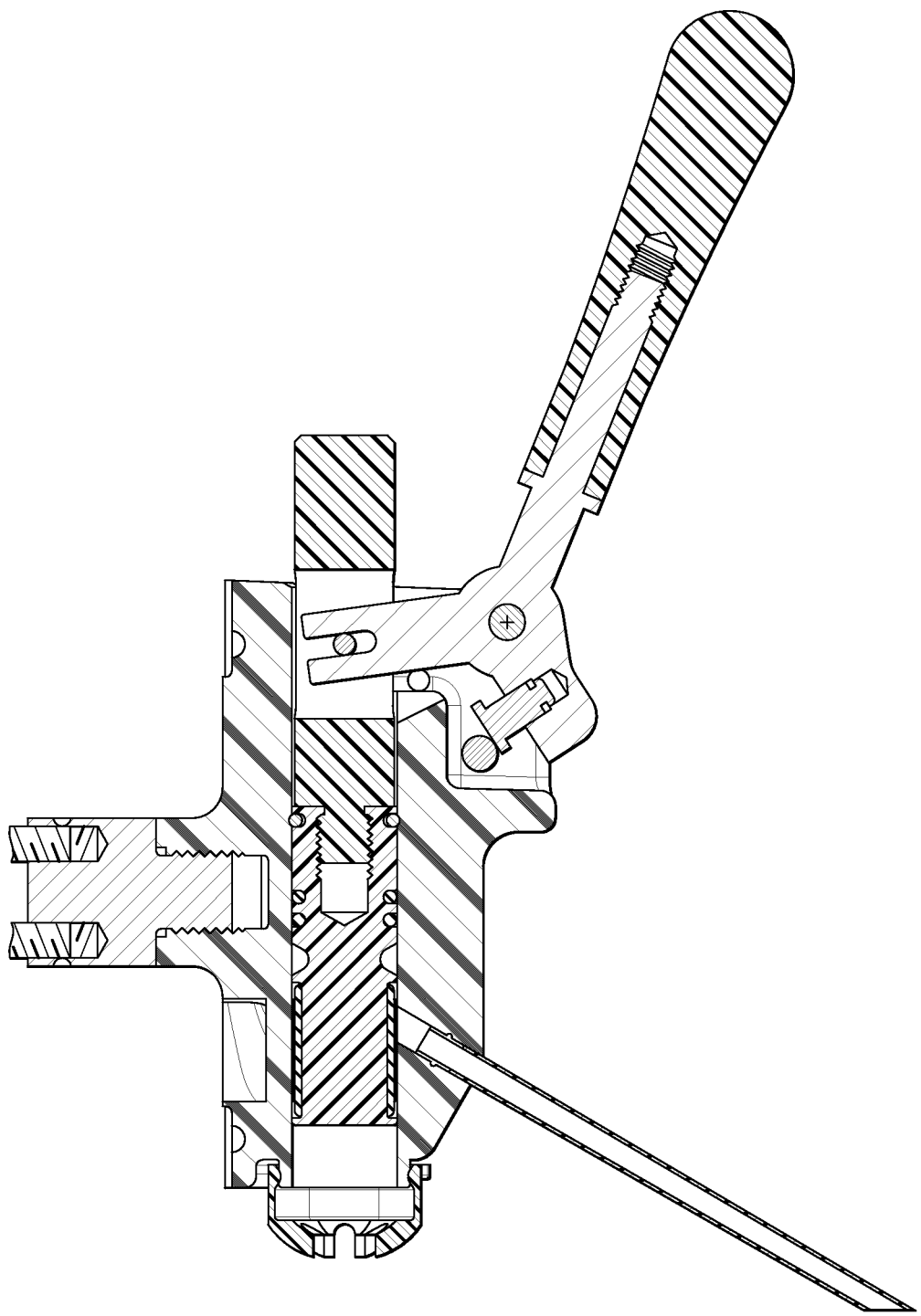
FIG. 12 is a vertical sectional view of the valve assembly of FIG. 10, taken along line 12-12.

As is discussed further below, FIG. 5 shows the locking mechanism 134 in its first condition which permits rotation of the lever from the neutral/off condition to the first condition. As noted above, the lever first condition is associated with discharge of confection from the first outlet 70 as is typically associated with filling an ice cream cone or the like. Accordingly, in the first condition of the locking mechanism 134 an associated indicia 136 (FIG. 6) is visible. The exemplary indicia 136 is the word "CONE" on the axle/leg 122 immediately to the loop end 130 side of the adjacent first wall (right side wall) 138 of the channel 124 (which has a second wall (left side wall) 139). The exemplary secondary pin 132 is L-shaped, having a foot 140 mounted to a second end portion 142 of the axle/leg 122. The secondary pin 132 has a leg 146 which extends along an axis 514 to an end 148. In the selector first condition, the leg 146 (FIG. 8) blocks movement of the lever 74 toward the lever second condition via contacting the underside of a valve actuation arm (driven arm) 150 of the lever 74. To shift between conditions, the selector 133 may be laterally shifted (e.g., to its second condition shown in FIG. 10). In this condition, a second indicia 160 (e.g., "FILL") along the axle/leg 122 moves out from the second wall 139 and becomes visible on the side of the channel 124 opposite the loop end 130 of the pin 126. During this shift, the first indicia 136 becomes concealed behind the first wall 138. In this condition, the leg 146 and end 148 are clear of the driven arm 150 but the second leg 162 of the pin (extending to an end 164) now blocks movement of the lever toward the lever first condition (e.g., via cooperating with a stop arm 166 of the lever) (e.g., via an adjustable stop 168 (FIG. 8)). Exemplary materials for the pins are stainless steel.

Turning to FIG. 8, the exemplary valve member 80 is seen as comprising a lower portion 180 and an upper portion 182 coaxially secured along the axis 512 (e.g., via threaded engagement). The exemplary lower portion is formed of metal (e.g., MIL-A-8625 anodized aluminum alloy) while the exemplary upper portion is formed of a plastic (e.g., CELCON M90 acetal copolymer from Ticona, a division of Celanese Corporation or DELRIN polyoxymethylene plastic from E.I. du Pont de Nemours and Company). The upper portion 182 has radial through aperture 184 across which a pin 186 extends. The pin is captured in an end yoke 188 of the driven arm 150 so that rotation of the lever 74 is converted to vertical movement of the valve member with the pin 186 sliding within the open channel 190 of the end yoke.

The exemplary lower portion 180 has a series of grooves/channels in its lateral periphery 192. As is discussed further below, an intermediate circumferential channel 194 functions to pass flow from the inlet 70 to the sting when the valve assembly is in its second condition. Immediately above the channel 194 are a pair of circumferential channels 196 which each carry an O-ring to seal the valve member to the bore. Above these channels is a channel 200. In the neutral condition, the channel 200 is aligned with an inwardly-open shallow channel 202 in the bore 82. This allows an additional O-ring carried by the channel 200 to cooperate with the channel 202 to detent the action of the valve mechanism at the neutral condition. Below the channel 194, and immediately above the lower end/face 204 of the valve element, is a channel system 210 (FIG. 9) comprising upper and lower annular grooves 211, 212 and four axial grooves 213 which receives an elastomeric seal 214 having corresponding upper and lower rings 215, 216 and four axial legs 217 joining those rings. This seal 214 provides a full seal of the inlet 70 in the neutral condition. In this condition, one of the vertical seal legs seals against a vertical guard portion 220 (FIG. 8) which extends along the inlet 70. The guard 220 helps prevent any object entering through the outlet 72 from, in turn, getting into the beater assembly.

Figure 13:
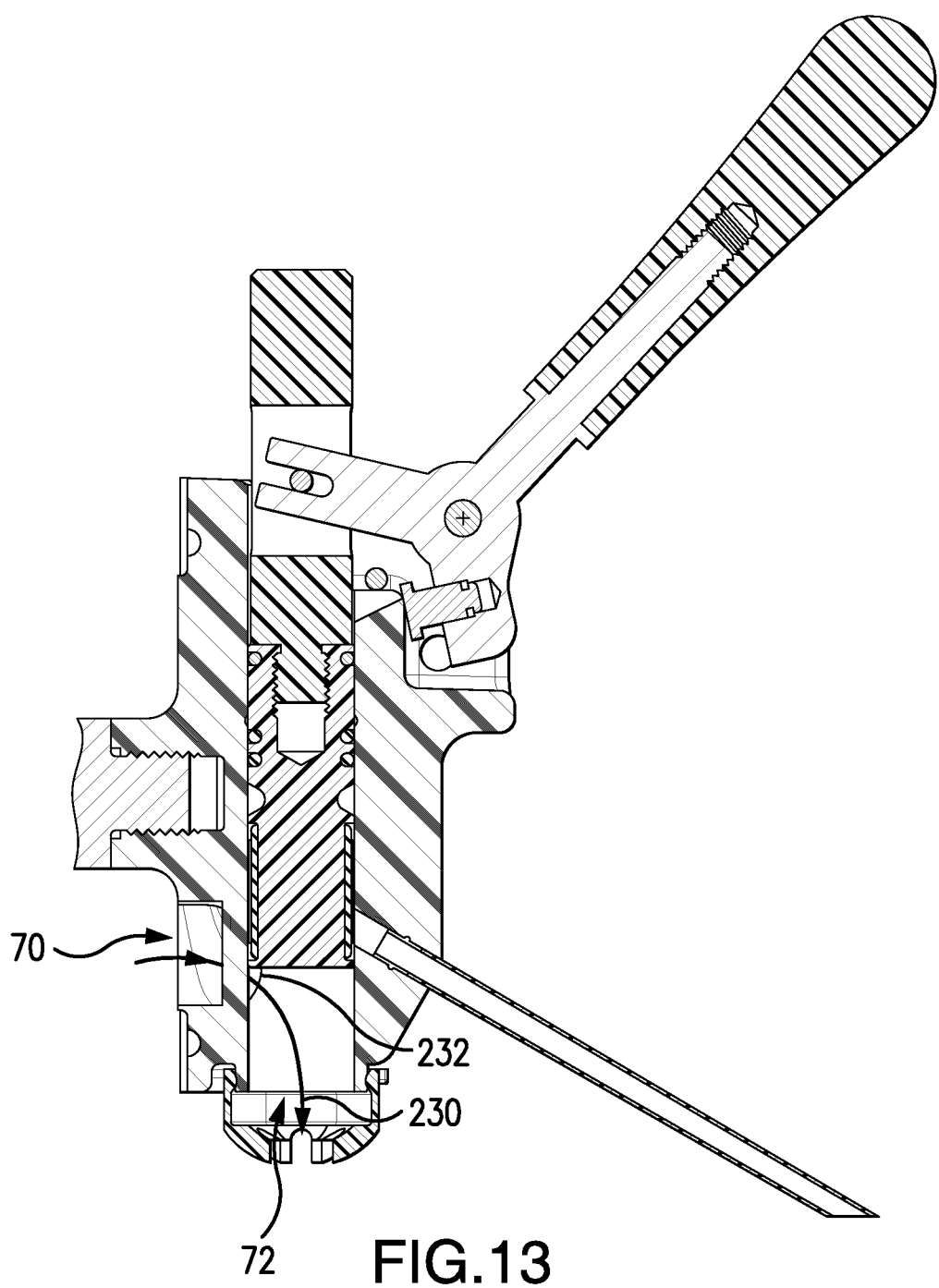
FIG. 13 is a view of the valve assembly in an extrusion/pouring condition.

With the locking mechanism 134 in its first condition, the lever handle may be rotated downward to its first condition. This downward rotation raises the valve element (e.g., to the FIG. 13 condition wherein the end of the adjustable stop 128 has contacted an adjacent portion of the valve body). This permits a flow 230 of the product to enter the inlet 70 from the freezing cylinder and exit the outlet 72. In this condition, the valve lower member lower face 204 has raised partially above a port 232 in the bore 82 formed at either side of the guard 220. The seals, however, still block an upper portion of the port 232.

Figure 14:
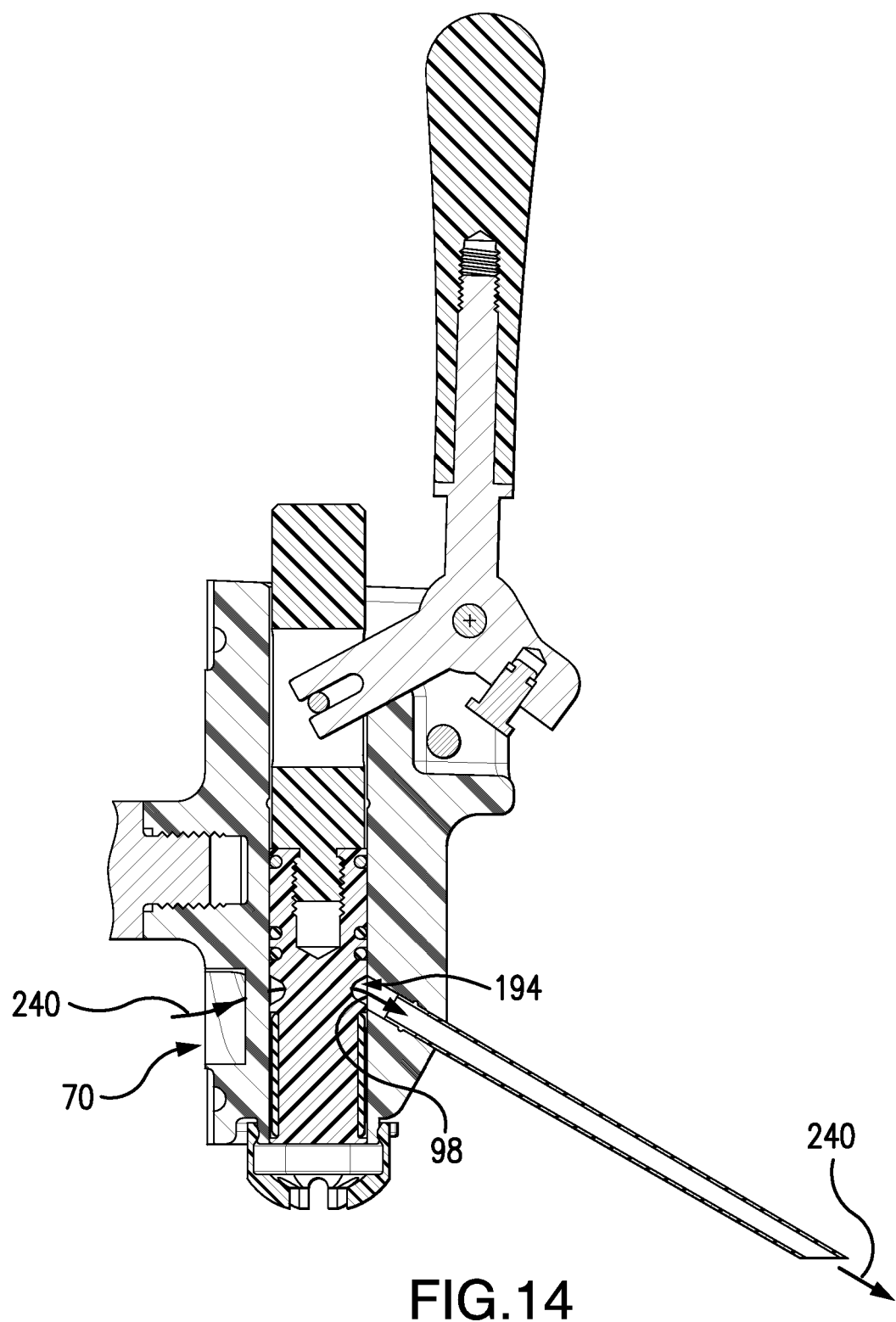
FIG. 14 is a vertical/longitudinal sectional view of the valve assembly in an injection orientation.

For use of the secondary outlet 90, the lever may be returned to the neutral condition and the locking mechanism shifted to its second condition. Thereafter, the lever handle may be rotated upward (FIG. 14) causing a further downward movement of the valve member. In this condition, the channel 194 comes into registry with both the cross bore opening/port 98 and an upper portion of the port 232, thereby allowing a flow 240 to pass through the inlet 70.

Figure 15:
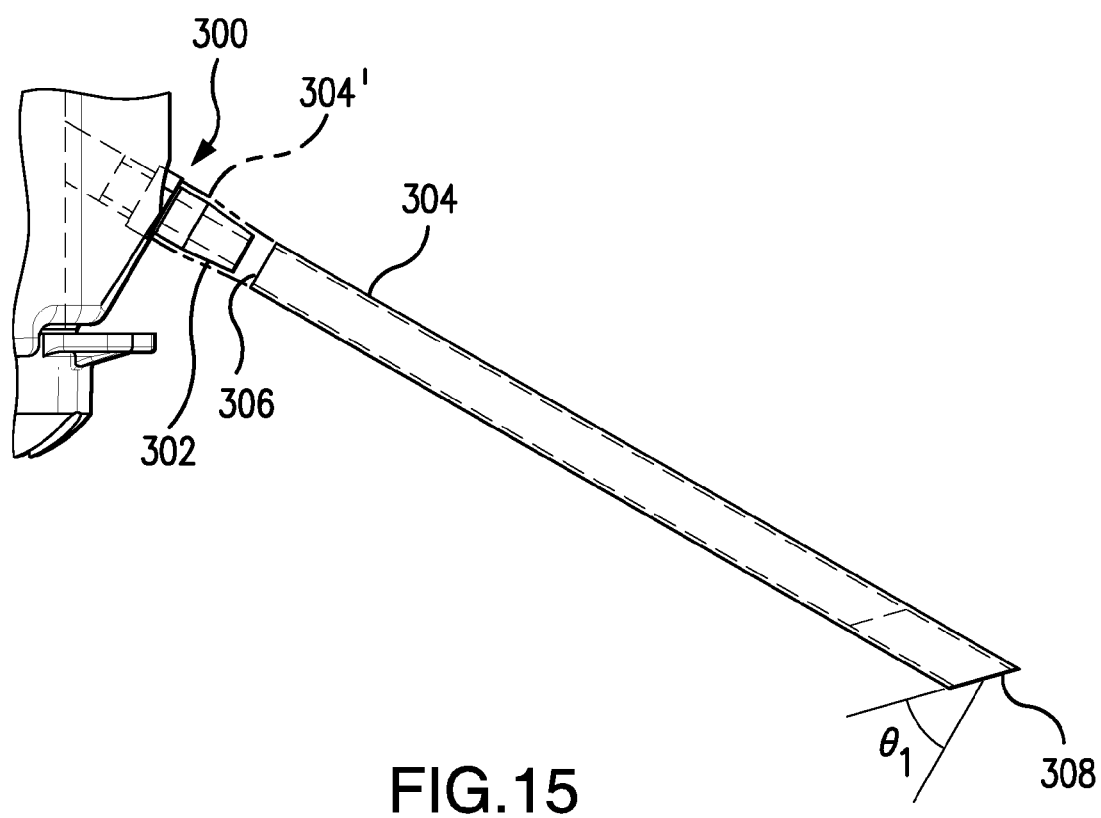
FIG. 15 is a partial view of an alternate valve assembly having an alternate injection probe.

FIG. 15 shows an alternate variation which may be otherwise similar to the system described above. However, this variation replaces the snap-in probe with a nipple 300 (e.g., machined stainless steel) threaded into the cross bore. The nipple has a tapering distal portion 302 which can receive the proximal end of a straw 304 (e.g., non-metallic such as extruded polypropylene or other plastic). For example, a proximal end portion of the straw may be stretched over the nipple. FIG. 15 shows the straw 304 in solid line prior to insertion and in broken line as 304' in installed condition. The straw has a distal end 308 forming the outlet and which may be cut at an angle. An exemplary off-radial angle $\theta_1$ is other than 0° (more narrowly at least 30°, 30-60°, or an exemplary 45°). This facilitates the straw to be economically made (e.g., via making alternate cuts in a continuous straw: one cut at a 90° angle off-axial (0° off-radial, more broadly, 0-30° off-radial), to form the proximal end 306 of two straws and the next cut at the 45° angle to form the distal ends of two straws). Thus, the straw 304 may be more economically made than the probe 92 and thus may more economically be disposed of (e.g., disposed and replaced at a more frequent interval than the probe 92 (e.g., replaced with every injected product or batch thereof)).

Manufacturing methods and materials may otherwise be the same as those of any baseline system. Similarly, use parameters of the baseline system may otherwise be the same.

Although an embodiment is described above in detail, such description is not intended for limiting the scope of the present disclosure. It will be understood that various modifications may be made without departing from the spirit and scope of the disclosure. For example, when implemented in the engineering of an existing system configuration or the remanufacturing of an existing system, details of the existing system or configuration may influence or dictate details of the particular implementation. Accordingly, other embodiments are within the scope of the following claims.

What is claimed is:
1. A confectionary product dispensing system comprising:
   a cabinet (22) having a front (24);
   a source (42, 50, 52) of the confectionary product within the cabinet; and
   a valve assembly mounted on the front and comprising:
      an inlet (70) coupled to the source;
      a first outlet (72);
      a second outlet (90);
      a valve element (80) shiftable between:
         a first condition providing communication between the inlet and the first outlet; and
         a second condition providing communication between the inlet and the second outlet; and
      an actuator (74) coupled to the valve element and manually engagable by a user to shift the valve element between the first condition and the second condition,
   wherein:
      the actuator comprises a lever (74), the lever being shiftable from a neutral condition to respective first and second lever conditions to, respectively, shift the valve element to the valve element's first and second conditions; and
      the assembly further comprises a user-engagable locking member (133) shiftable between respective first and second conditions, the locking member first and second conditions respectively blocking movement of the lever to the lever second and first conditions.

2. The system of claim 1 wherein:
in the first condition, the valve element blocks communication between the inlet and the second outlet;
in the second condition, the valve element blocks communication between the inlet and the first outlet; and
the valve element has a third condition blocking communication between the inlet and both the first outlet and second outlet.

3. The system of claim 1 wherein:
the locking member (133) is laterally shiftable between the respective first and second conditions.

4. The system of claim 3 wherein:
the locking member bears respective first and second indicia (136, 160) indicating the first and second locking member conditions.

5. The system of claim 1 wherein:
the second outlet is at the end of a non-metallic sting (92; 304).

6. The system of claim 5 wherein:
the non-metallic sting comprises a straw (304) having an off-radial cut and forming a lance.

7. The system of claim 5 wherein:
the non-metallic sting comprises a straw (304) having a proximal portion stretched over a nipple (300) protruding from a body of the valve assembly.

8. The system of claim 7 wherein one-to-all of:
the straw is an extrusion;
the straw has a distal end cut at an at least 30° off-radial angle; and
the straw has a proximal end cut at a less than 30° off-radial angle.

9. The system of claim 5 wherein:
the non-metallic sting comprises a plastic straw.

10. The system of claim 1 wherein:
the locking member first condition permits movement of the lever between the neutral condition and the lever first condition; and
the locking member second condition permits movement of the lever between the neutral condition and the lever second condition.

11. A valve assembly (38) for dispensing a confectionary product, the valve assembly comprising:
an inlet (70);
a first outlet (72);
a second outlet (90);
a valve element (80) shiftable between:
a first condition providing communication between the inlet and the first outlet; and
a second condition providing communication between the inlet and the second outlet; and
an actuator (74) coupled to the valve element and manually engagable by a user to shift the valve element between the first condition and the second condition, wherein:
the actuator comprises a lever (74), the lever being shiftable from a neutral condition to respective first and second lever conditions to, respectively, shift the valve element to the valve element's first and second conditions;
the assembly further comprises a user engagable locking member (133) shiftable between respective first and second conditions, the locking member first and second conditions;
the locking member (133) is laterally shiftable between the respective first and second conditions; and
the locking member (133) comprises:
a first pin (126) having:
a first leg (122) forming a pivot axle of the lever; and
a second leg (128) positioned to block the movement of the lever to the second condition in the locking member first condition; and
a second pin (132) coupled to the first pin and having a portion (146) positioned, in the locking member second condition, to block movement of the lever to the lever first condition.

12. A confectionary product dispensing system comprising:
a cabinet (22) having a front (24);
a source (42, 50, 52) of the confectionary product within the cabinet; and
a valve assembly mounted on the front and comprising:
an inlet (70) coupled to the source;
a first outlet (72);
a second outlet (90); and
a valve element (80) shiftable between:
a first condition providing communication between the inlet and the first outlet; and
a second condition providing communication between the inlet and the second outlet.

13. The system of claim 12 in combination with the confectionary product, the confectionary product being a frozen confectionary product.

14. The system of claim 13 wherein:
the source comprises a refrigeration system (50).

15. A method for manufacturing the system of claim 12 comprising:
removing a single-outlet valve assembly; and
replacing the single-outlet valve assembly with said valve assembly.

16. A method for operating the system of claim 12, the method comprising:
shifting the valve member to the first condition so as to dispense the confectionary product through the first outlet into at least one of a cup and a cone; and
inserting the second outlet into a food product and shifting the valve member to the second condition so as to dispense the confectionary product through the second outlet into the food product.

17. A valve assembly (38) for dispensing a confectionary product, the valve assembly comprising:
an inlet (70);
a first outlet (72);
a second outlet (90) at the end of a non-metallic sting (92; 304); and
a valve element (80) shiftable between:
a first condition providing communication between the inlet and the first outlet; and
a second condition providing communication between the inlet and the second outlet.

18. The system of claim 17 wherein:
the non-metallic sting comprises a straw (304) having an off-radial cut and forming a lance.

19. The system of claim 17 wherein:
the non-metallic sting comprises a straw (304) having a proximal portion stretched over a nipple (300) protruding from a body of the valve assembly.

20. The system of claim 17 wherein one-to-all of:
the non-metallic sting is an extrusion;
the non-metallic sting has a distal end cut at an at least 30° off-radial angle; and
the non-metallic sting has a proximal end cut at a less than 30° off-radial angle.

21. The system of claim 17 wherein:
the non-metallic sting comprises a plastic straw.

\* \* \* \* \*